US008615764B2

(12) United States Patent
Salapura et al.

(10) Patent No.: US 8,615,764 B2
(45) Date of Patent: Dec. 24, 2013

(54) DYNAMIC SYSTEM SCHEDULING

(75) Inventors: Valentina Salapura, Chappaqua, NY (US); Seetharami Seelam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 12/751,251

(22) Filed: Mar. 31, 2010

(65) Prior Publication Data
US 2011/0247002 A1 Oct. 6, 2011

(51) Int. Cl.
*G06F 9/46* (2006.01)
(52) U.S. Cl.
USPC .......................................... 718/104; 718/102
(58) Field of Classification Search
None
See application file for complete search history.

(56) References Cited

U.S. PATENT DOCUMENTS

| | | | | |
|---|---|---|---|---|
| 6,279,046 B1 * | 8/2001 | Armstrong et al. | ............... | 710/5 |
| 6,366,945 B1 * | 4/2002 | Fong et al. | ..................... | 718/104 |
| 6,438,553 B1 * | 8/2002 | Yamada | ................................. | 1/1 |
| 6,687,905 B1 * | 2/2004 | Day et al. | ...................... | 718/102 |
| 7,032,222 B1 * | 4/2006 | Karp et al. | ..................... | 718/104 |
| 7,143,401 B2 | 11/2006 | Babaian et al. | | |
| 7,467,102 B2 * | 12/2008 | Barsness et al. | ............. | 705/26.1 |
| 7,814,492 B1 * | 10/2010 | Creemer et al. | ............. | 718/104 |
| 8,051,269 B2 * | 11/2011 | Hamilton et al. | ............. | 711/170 |
| 8,185,899 B2 * | 5/2012 | Daly et al. | ..................... | 718/102 |
| 8,347,295 B1 * | 1/2013 | Robertson et al. | ............ | 718/103 |
| 8,495,627 B2 * | 7/2013 | Barsness et al. | .................. | 718/1 |
| 2002/0129085 A1 * | 9/2002 | Kubala et al. | .................. | 709/104 |
| 2003/0061269 A1 * | 3/2003 | Hathaway et al. | ............ | 709/202 |
| 2003/0135621 A1 | 7/2003 | Romagnoli | | |
| 2004/0068729 A1 * | 4/2004 | Simon et al. | ................... | 718/102 |
| 2006/0143204 A1 * | 6/2006 | Fish | .............................. | 707/101 |
| 2008/0059971 A1 * | 3/2008 | Abbey et al. | ................... | 718/104 |
| 2008/0098395 A1 * | 4/2008 | Backer | .......................... | 718/102 |
| 2008/0216081 A1 * | 9/2008 | Jackson | ......................... | 718/104 |
| 2008/0222640 A1 * | 9/2008 | Daly et al. | ..................... | 718/103 |
| 2009/0007125 A1 * | 1/2009 | Barsness et al. | ............... | 718/104 |
| 2009/0077561 A1 | 3/2009 | Feng et al. | | |
| 2009/0178049 A1 * | 7/2009 | Branda et al. | .................. | 718/104 |
| 2010/0185481 A1 * | 7/2010 | Parthasarathy | ..................... | 705/8 |
| 2011/0158248 A1 * | 6/2011 | Vorunganti et al. | ............ | 370/412 |
| 2011/0247003 A1 * | 10/2011 | Fong et al. | ..................... | 718/104 |

OTHER PUBLICATIONS

Beckert et al., A Tailored Design Partitioning Method for Hardware Emulation, INSPEC/IEEE; 2007.

(Continued)

*Primary Examiner* — Emerson Puente
*Assistant Examiner* — Hiren Patel
(74) *Attorney, Agent, or Firm* — Preston J. Young; Ryan, Mason & Lewis, LLP

(57) ABSTRACT

Resources of a partitionable computer system are partitioned into: (i) a first partition for first jobs, the first jobs being at least one of small and short running; and (ii) a second partition for second jobs, the second jobs being at least one of large and long running. The computer system is run as partitioned in the partitioning step and the partitioning is periodically re-evaluated against at least one threshold for at least one of the partitions. If the periodic re-evaluation suggests that one of the first and second partitions is underutilized, the resources of the partitionable computer system are dynamically re-partitioned to reassign at least some of the resources of the partitionable computer system from the underutilized one of the first and second partitions to another one of the first and second partitions.

16 Claims, 9 Drawing Sheets

(56) References Cited

OTHER PUBLICATIONS

Edel et al., Resource Preemption for Priority Scheduling, ip.com/ibm tdb, TDB 11-73, p. 1931, Nov. 1, 1973.

Kalyanasundaram et al., Utility Function-based Optimal Resource Allocation with a Mixture of Reallocation-tolerant and Reallocation-intolerant Users; ip.com/ibmtdb,Jun. 15, 2001.

Subhlok et al., Impact of Job Mix on Optimizations for Space Sharing Schedulers, ACM Digital Library/IEEE; pp. 1-10, 1996.

Peschlow et al., A Flexible Dynamic Partitioning Algorithm for Optimistic Distributed Simulation, ACM Digital Library/IEEE; 2007.

U.S. Appl. No. 12/751,288, filed Mar. 31, 2010, titled, Predictive Dynamic System Scheduling.

* cited by examiner

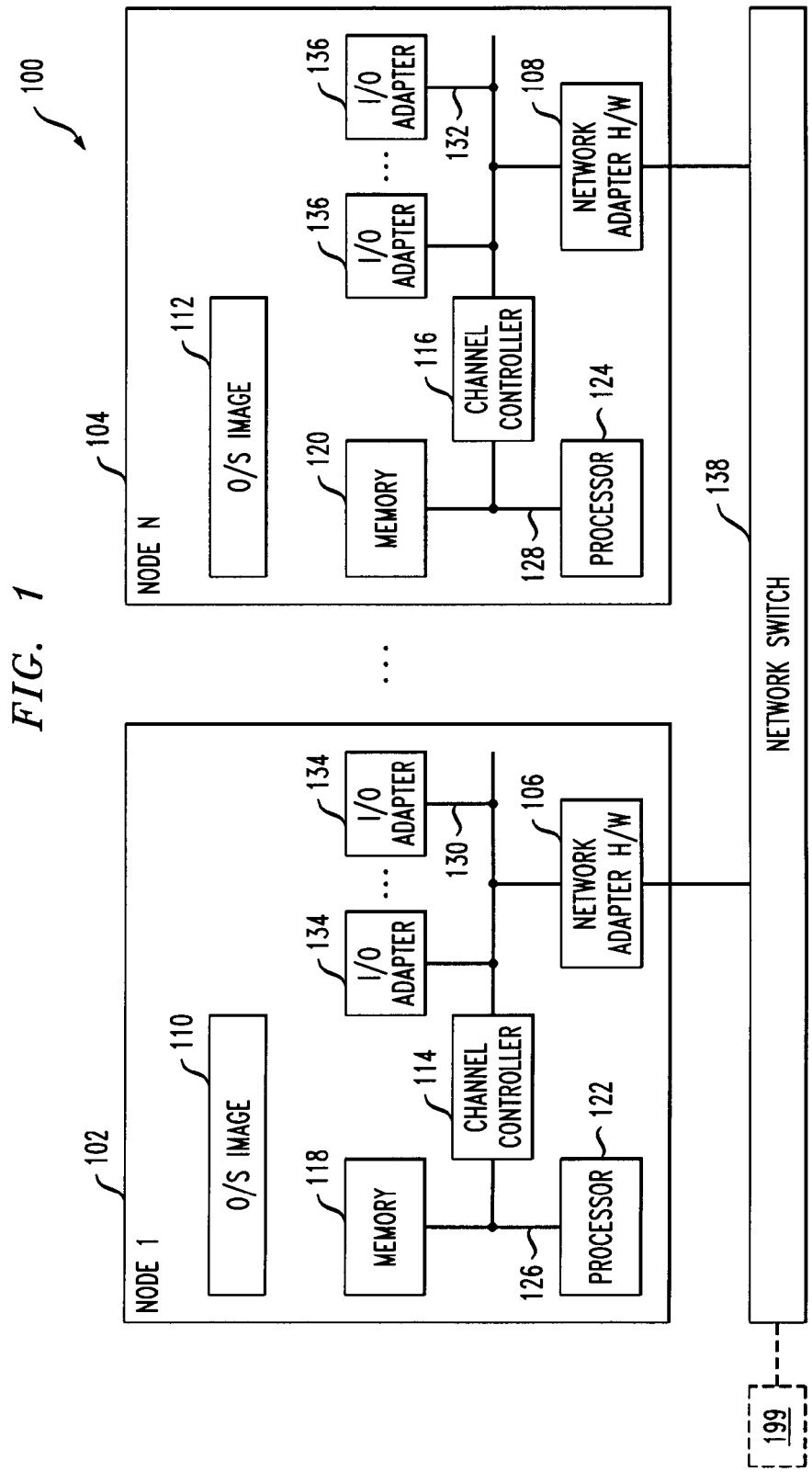

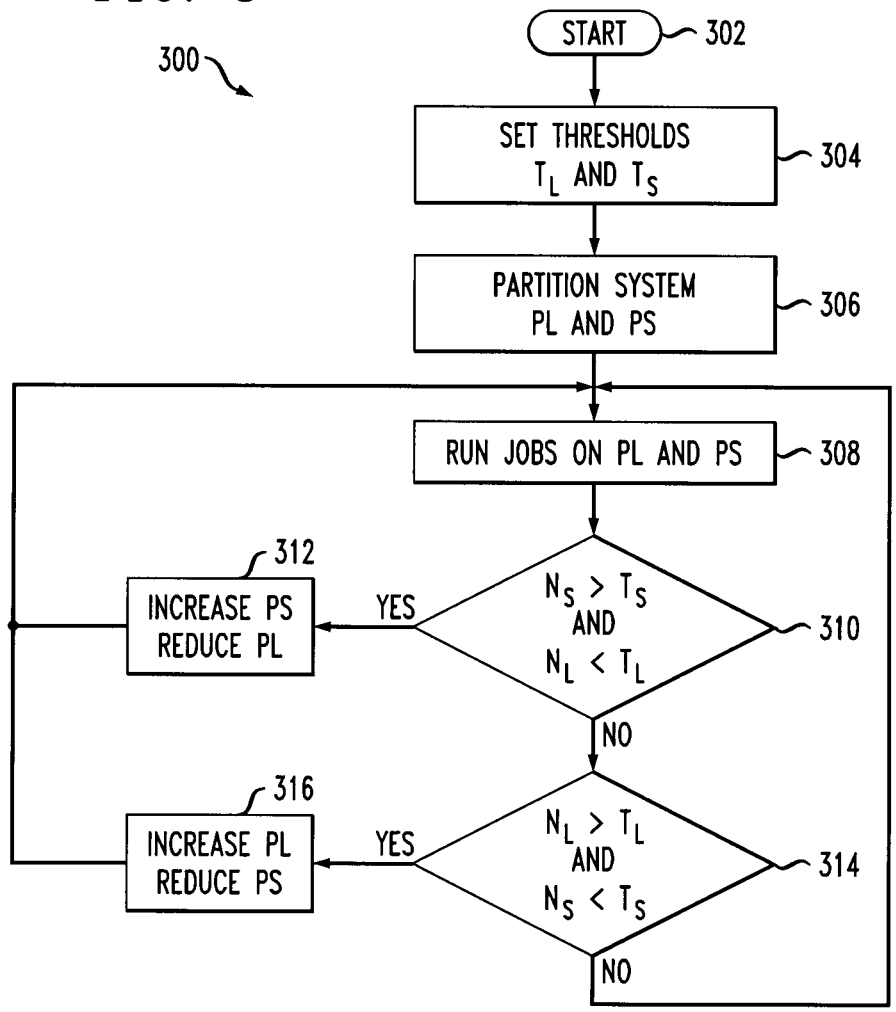

DYNAMIC SYSTEM SCHEDULING

FIELD OF THE INVENTION

The present invention relates generally to the electrical, electronic and computer arts, and, more particularly, to resource management in computer systems.

BACKGROUND OF THE INVENTION

Supercomputers and large scale computer cluster systems are expensive to acquire, maintain, and operate, so it important to optimally utilize these resources. Job scheduling techniques on these expensive systems are designed to maximize utilization while maintaining a minimal waiting time for users to get access to the resources. These systems typically have many applications of different sizes that require different amounts of resources waiting to run in the queue. Research shows that the applications that require large amounts of resources also run longer on the system. Research also shows that the fraction of small and medium scale jobs is much larger than larger scale jobs. Thus, these small jobs tend to wait longer in the queues while a few larger jobs occupy the system for longer durations. Another property of the small jobs is that they are usually submitted by interactive users whose productivity is also a function of the completion time of these jobs. Accordingly, in these systems, timely completion of a single job is less important, but it is increasingly important to increase the job throughput.

In current large scale systems, backfill schedulers are used as a way to maximize resource utilization while preventing excessive delays in starting large jobs. In a system with a backfill scheduler, jobs are allocated resources according their priority in the queue. The highest priority job may not start immediately when some resources are available but not enough. The backfill technique calculates the earliest time into the future when all required resources will be available and then it attempts to backfill all other jobs that require the available resources and that finish before the earliest start time of the highest priority job. Backfill ensures that it will not delay the start of the highest priority job.

SUMMARY OF THE INVENTION

Principles of the invention provide techniques for dynamic system scheduling. In one aspect, an exemplary method includes the step of partitioning resources of a partitionable computer system into: (i) a first partition for first jobs, the first jobs being at least one of small and short running; and (ii) a second partition for second jobs, the second jobs being at least one of large and long running. Additional steps include running the computer system as partitioned in the partitioning step; and periodically re-evaluating the partitioning against at least one threshold for at least one of the partitions. If the periodic re-evaluation suggests that one of the first and second partitions is underutilized, a further step includes dynamically re-partitioning the resources of the partitionable computer system to reassign at least some of the resources of the partitionable computer system from the underutilized one of the first and second partitions to another one of the first and second partitions.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Some embodiments include multiple nodes each with one or more memories and one or more processors. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

One or more embodiments of the invention may offer one or more of the following technical benefits:
  Efficient resource utilization
  Faster response time for interactive jobs
  Improved job throughput
  Improved productivity
  Greater return on investment
  Reduced power consumption (due to increased efficiency and reduced operation time) and reduced cost These and other features, aspects and advantages of the invention will become apparent from the following detailed description of illustrative embodiments thereof, which is to be read in connection with the accompanying drawings.

BRIEF DESCRIPTION OF THE DRAWINGS

FIG. 1 shows a schematic block diagram of a parallel-distributed processing system;

FIG. 3 shows method steps in a first exemplary method for dynamic system scheduling, according to an aspect of the invention;

DETAILED DESCRIPTION OF PREFERRED EMBODIMENTS

Figure 2A:
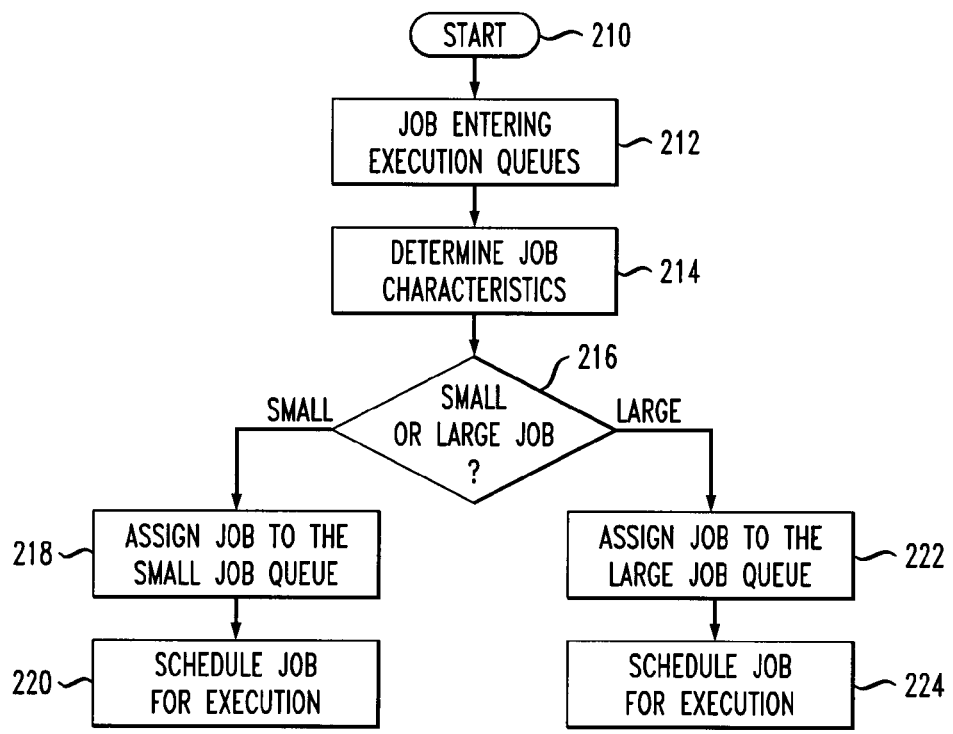
FIG. 2A shows method steps for assigning a job to one of two queues.

As noted, supercomputers and large scale computer cluster systems are expensive to acquire, maintain, and operate, so it important to optimally utilize these resources. Job scheduling techniques on these expensive systems are designed to maximize utilization while maintaining a minimal waiting time for users to get access to the resources. These systems typically have many applications of different sizes that require different amounts of resources waiting to run in the queue at any given time. There is continual dynamic change as applications start and finish execution. Research shows that the applications that require large amounts of resources also run longer on the system. Research also shows that the fraction of small and medium scale jobs is much larger than larger scale jobs. Frequently, these small jobs tend to wait longer in the queues while a few larger jobs occupy the system for longer durations. Another property of the small jobs is that they are usually submitted by interactive users whose productivity is also a function of the completion time of these jobs. Accordingly, in these systems, timely completion of a single job is less important, but it is increasingly important to increase the job throughput.

Non-limiting examples of such systems include:
multiprocessor clusters,
parallel supercomputers such as the Blue Gene/P and Blue Gene/Q machines from International Business Machines Corporation of Armonk, N.Y., USA; refer also to US Patent Publication 2009/0006808 "Ultrascalable Petaflop Parallel Supercomputer"—while the skilled artisan will be familiar with same, the complete disclosure of US Patent Publication 2009/0006808 is nevertheless expressly incorporated herein by reference in its entirety for all purposes,
NEC Corporation's Earth Simulator supercomputer, and
Tivoli Workload Scheduler LoadLeveler® parallel job scheduling system (registered mark of International Business Machines Corporation, Armonk, N.Y., USA)

As also noted, in current large scale systems, backfill schedulers are used as a way to maximize resource utilization while preventing excessive delays in starting large jobs. In a system with a backfill scheduler, jobs are allocated resources according their priority in the queue. For example, a short job (or a job requiring small partition) may be scheduled before a higher priority, large job, if the higher priority job cannot start immediately because there are some available resources but not enough. The backfill technique calculates the earliest time into the future when all required resources will be available and then it attempts to backfill all other jobs that require the available resources and that finish before the earliest start time of the highest priority job. Backfill ensures that backfilled jobs will not delay the start of the highest priority job. Resources are available only for the highest priority job(s); all other jobs are backfill candidates.

In both backfilled and non-backfilled scheduling techniques, a job acquires resources once and it occupies them until its completion. These techniques make no attempt to re-evaluate resource allocation during the application run. Reevaluation and reallocation of resources has many advantages. Applications may go through phases wherein not all resources initially required by the application are required in such phases, resulting in an underutilization of the resources in such phases. The reallocation allows for providing only the required number of resources for the different phases of the application. Also, large jobs that occupy larger fractions of the system result in blocking the short jobs for longer periods of time. Accordingly, a long queue of small and short jobs has to wait until completion of the large high priority job. This results in shorter jobs having a very long waiting time. Therefore, it is desirable to minimize the waiting time of the shorter jobs for efficient system allocation, to maximize workload throughput, and to improve user productivity.

One or more embodiments of the invention provide a method and apparatus for dynamic system scheduling to allow for the efficient, and preferably optimal, utilization of multiprocessor resources. One or more instances employ two queues corresponding to system partitions of two different sizes (small and large). The resources are dynamically re-assigned at appropriate times, and resources from the under-utilized partition are allocated to the other size partition.

One or more embodiments advantageously increase job throughput in a system. To achieve this goal, the system makes use of multiple job queues. As used herein, "small" and "large" refer to the amount of system resources and "short" and "long" refer to the time these resources are needed by a job.

In one non-limiting exemplary embodiment, the available system resources are partitioned into two sets. Each partition includes a corresponding job queue. Of the two queues, one queue is assigned for small and/or short running jobs and another for large and/or long running jobs. Each partition has assigned a low water mark threshold for the number of jobs in the corresponding queue. At appropriate time intervals (such as checkpoints, regular time intervals, job completion times, or times defined by some other criteria) the partitions are re-evaluated to determine if resources should be moved from one partition to another. Resources from the under-utilized partition are reassigned to the other partition. For example, if the number of jobs in one queue is under the low-water mark threshold, repartition the system and assign the resources from the underutilized partition (thus reducing the under-utilized partition) to the partition of the other queue. Thus, the resource allocation to available partitions is performed dynamically. This dynamic re-partitioning makes the system adaptable to a changing application mix and increases the number of completed jobs (throughput).

The dynamic allocation changes can be evaluated and resources can be dynamically re-assigned (by evaluating demand and re-partitioning) at appropriate time intervals, which can be, by way of example and not limitation: job termination, job checkpoints, regular time intervals (such as time of day), requests by the currently running applications based on their state, triggered by a workflow manager, and/or at program phase change detected by performance monitors. Other time interval selections are also possible.

Dynamic re-partitioning advantageously makes the system adaptable to application mix change and increases the number of completed jobs (throughput).

Accordingly, one or more instances of the invention advantageously provide efficient system allocation to maximize workload throughput. One or more embodiments of the invention provide a method and apparatus for predictive dynamic system scheduling to allow for the enhanced, and even optimal, utilization of multiprocessor resources. In at least some cases, multiple modes of operations are employed, and are based on historic observation of resource usage. The requirements on the resources are predicted based on the history, and are dynamically re-assigned at appropriate times. If the resource usage observed is not optimal, the resources are reassigned dynamically.

Exemplary Parallel Computer System

FIG. 1 shows a parallel-distributed processing system in which one or more embodiments of the invention can be implemented; the same is a non-limiting example of a system that can employ techniques according to one or more embodiments of the invention. In this embodiment, the parallel-distributed processing system 100 operates in an SMP (symmetric multiprocessing) computing environment. In an SMP computing environment, parallel applications can have several tasks (processes) that execute on the various processors on the same processing node. The parallel-distributed processing system 100 executes on a plurality (e.g., N) of processing nodes 102 and 104 coupled to one another via a plurality of network adapters 106 and 108. Each processing node 102 and 104 is an independent computer with its own operating system image 110 and 112, channel controller 114 and 116, memory 118 and 120, and processor(s) 122 and 124 on a system memory bus 126 and 128. A system input/output bus 130 and 132 couples I/O adapters 134 and 136 and communication adapters 106 and 108. Although only one processor 122 and 124 is shown in each processing node 102 and 104 for simplicity, each processing node 102 and 104 can have more than one processor, which processors may be homogeneous or heterogeneous processors. The communication adapters are linked together via a network switch 138. In some embodiments, the various processing nodes 102 and 104 are able to be part of a processing cluster. It is to be emphasized that the configuration of FIG. 1 is exemplary and non-limiting in nature.

Scheduling

Referring now to FIG. 2A, an exemplary flowchart describing job scheduling is presented. In the preferred embodiment, two job queues are implemented, a queue for the small and/or short jobs, and a queue for the large and/or long jobs. After the start of the system in the step 210, a job enters the execution queue in step 212. In the non-limiting example, each job needs to be assigned to one of the two queues based on the job's characteristics. The characteristics of each job are accessed at the step 214. The job properties considered for assignment to one of the queues in the preferred embodiment are the length of the job, the amount of computing resources required for its completion, and interactive or batch nature of the job, but other characteristics can be used for assigning a job to one of the two queues in other embodiments. Based on job characteristic(s), each job is queued in one of the two queues in the step 216.

Non-limiting examples of "small" and "short" jobs include debugging, interactive programs, development, testing, and the like. As used herein, "short" means relatively short execution times; and "small" means that relatively few resources; e.g., relatively few nodes, are required. Non-limiting examples of "long" and "large" jobs may refer to production runs, batch jobs, month-end reports, and the like. As used herein, "long" means relatively long execution times such as multiple minutes, hours, or even days; and "large" means that relatively many resources; e.g., relatively many nodes, are required.

In the preferred embodiment, use two job queues, and dynamically re-size the partitions of computing resources paired to each of the queues. In other embodiments, more than two queues can be used.

In the steps 218 and 222, the jobs are assigned to the queue for small or for large jobs, respectively. To each queue are assigned computing and interconnects resources, i.e., its queue partition. Each job entering an execution queue is being started when it is the first or highest priority job in its queue, and when resources in that queue requested by that job are available, as indicated in the steps 220 and 224. Within each queue and queue partition any appropriate method for job scheduling can be used.

Based on the demand for the resources in each of the two system partitions, the computing and interconnects resources assigned to each job queue are evaluated and dynamically reallocated at specified time intervals.

Resource Usage Example

Figure 2B:
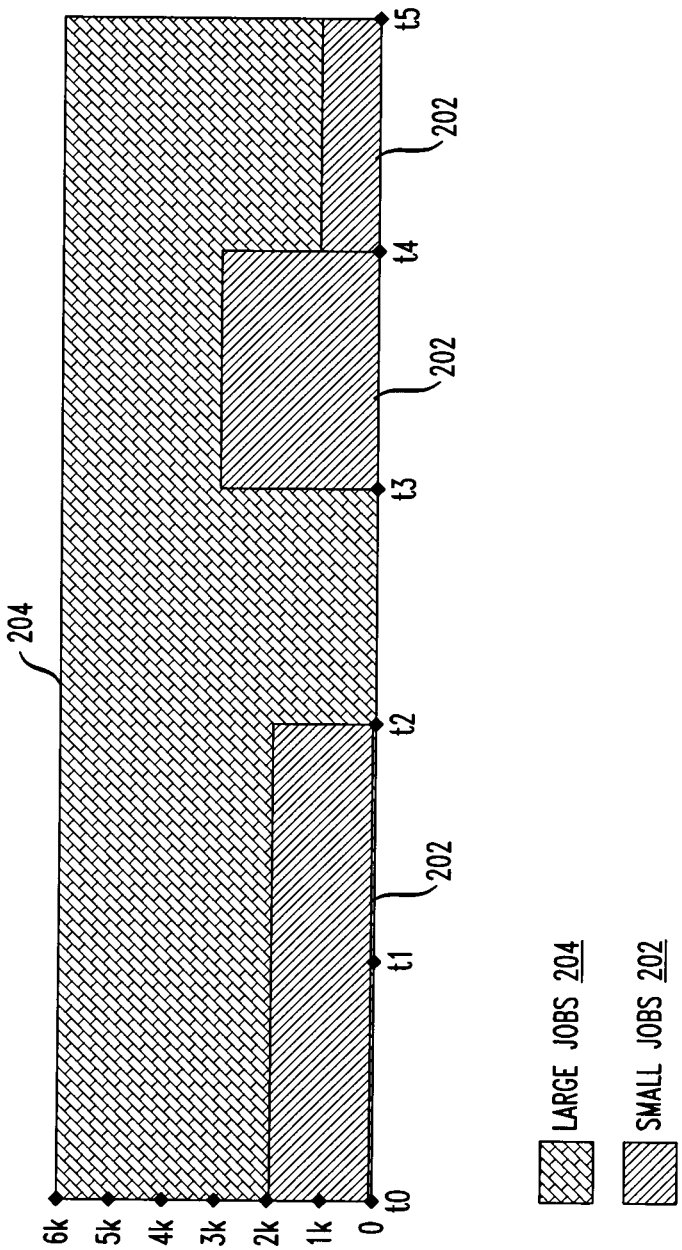
FIG. 2B shows exemplary resource utilization.

With reference now to FIG. 2B, the small job queue is 202 and the large job queue is 204. Let $N_S$ be the number of small jobs in 202 at any given time t and $N_L$ be the number of large jobs in 204 at the same time. Also assume $T_S$ be the threshold for the small job queue 202 and $T_L$ to be the threshold for the large job queue 204. The time t is represented by t0, t1, ..., t5 in the figure. As an example, assume $T_S=1.5K$ and $T_L=3.5K$.

At points t0 and t1, the number of small jobs in 202 ($N_S$)) is 2K which is greater than its threshold $T_S$ ($T_S=1.5K$), and the number of large jobs in 204 ($N_L$) is 4K which is greater than its threshold $T_L$ ($T_L=3.5K$). So, in this instance, both queues of the exemplary computer system are greater than their thresholds, i.e., $N_S>T_S$ and $N_L>T_L$ so no re-assignment of resources occur at these points.

At point t2, the number of small jobs 202 is less than the threshold, i.e., $N_S<T_S$. Accordingly, the resources are rebalanced, and resources from the small queue are taken away and assigned to the large queue. At point t3, the number of large jobs 204 completed, and the number of large jobs waiting for execution dropped below the threshold for large jobs, i.e., $N_L<T_L$. Accordingly, resources are removed from the partition for large jobs, and are reassigned to the partition paired to the queue for small jobs.

At point t4, the number of small jobs completed, and the pressure on the partition for small jobs is reduced. The number of outstanding jobs waiting for execution in the small queue dropped below the threshold for small jobs, i.e., $N_S<T_S$. In the exemplary embodiment, resources are again reassigned to the partition for large jobs.

First Non-Limiting Exemplary Embodiment

With reference now to flow chart 300 of FIG. 3, after beginning in block 302, in block 304, set the low water mark threshold for the number of jobs in the corresponding queue of each partition. The selection of these thresholds may depend on a number of factors including expected number of small and large jobs in a given environment, prior experience reported by users of the system, or expected response time and throughput considerations. Other factors can also be considered.

In block 306, partition the system into the partition for the queue assigned for small and/or short running jobs and the partition for the queue assigned for large and/or long running jobs. The partition is typically done by considering the resource needs for the respective jobs and users. For example, the small and short running jobs are for test and development while the large jobs are for production. In this case, a small cluster is allocated for test and development and a larger cluster is allocated for production runs.

In block 308, run various jobs on the partitioned system. Periodically carry out the checks in decision blocks 310 and 314 (the period can be selected as discussed elsewhere herein).

In particular, in decision block 310, determine if a condition exists wherein the low water mark for small and/or short jobs is exceeded but that for large and/or long jobs is not exceeded; if such is the case ("YES" branch), then re-partition by decreasing the resources devoted to large and/or long jobs and increasing those devoted to small and/or short jobs, as at block 312. Then run jobs under the new partition as in block 308, and make another check in due course.

On the other hand, if decision block 310 returns a "NO," proceed to decision block 314. In decision block 314, determine if a condition exists wherein the low water mark for large and/or long jobs is exceeded but that for small and/or short jobs is not exceeded; if such is the case ("YES" branch), then re-partition by increasing the resources devoted to large and/or long jobs and decreasing those devoted to small and/or short jobs, as at block 316. Then run jobs under the new partition as in block 308, and make another check in due course. Otherwise, as per the "NO" branch of block 314, simply continue to run jobs under the old partition as in block 308, and make another check in due course.

When reassigning resources between the two partitions, a number of compute and interconnects resources are moved from one partition to the other partition. The exact size of the resources moved from one partition to the other can be either predetermined, or it can be programmable. In addition, the size of resources assigned from the queue A to the queue B does not have to be the same as when assigning resources from the queue B to the queue A. The selection of the size of resources to be moved from one partition to the other can be performed in any appropriate way, and different embodiments may use different techniques.

Second Non-Limiting Exemplary Embodiment

Figure 4:
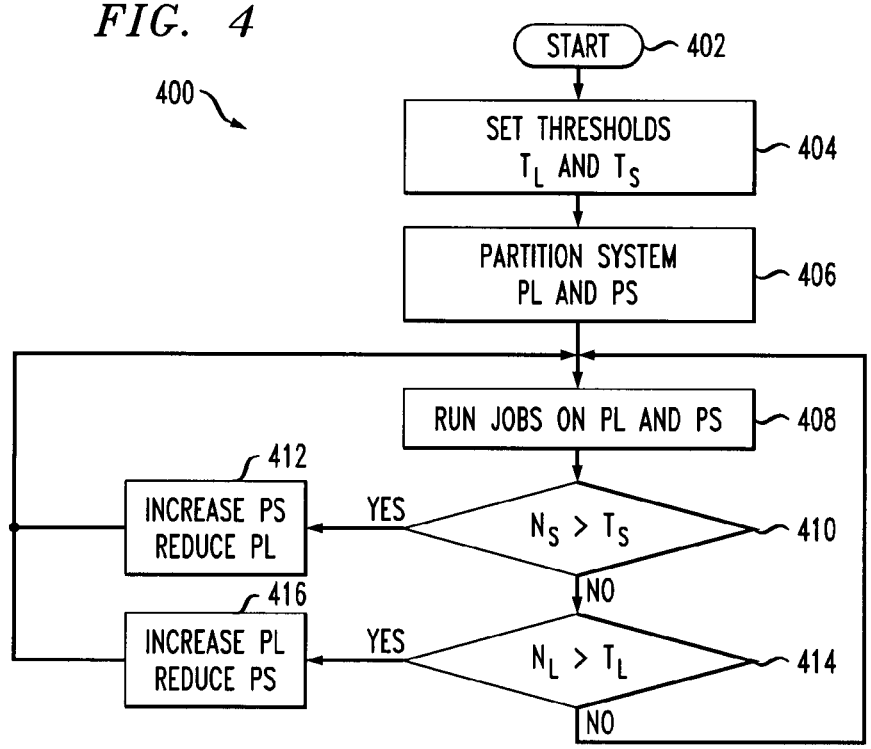
FIG. 4 shows method steps in a second exemplary method for dynamic system scheduling, according to another aspect of the invention.

With reference now to flow chart 400 of FIG. 4, after beginning in block 402, in block 404, set the low water mark threshold for the number of jobs in the corresponding queue of each partition. The selection of these thresholds may depend on a number of factors including expected number of small and large jobs in a given environment, prior experience reported by users of the system, or expected response time and throughput considerations. Other factors can also be considered.

In block 406, partition the system into the partition for the queue assigned for small and/or short running jobs and the partition for the queue assigned for large and/or long running jobs. Partitioning can be carried out as described above (of course, using the criteria as described for this embodiment). In block 408, run various jobs on the partitioned system. Periodically carry out the checks in decision blocks 410 and 414 (the period can be selected as discussed elsewhere herein).

In particular, in decision block 410, determine if a condition exists wherein the low water mark for small and/or short jobs is exceeded; if such is the case ("YES" branch), then re-partition by decreasing the resources devoted to large and/or long jobs and increasing those devoted to small and/or short jobs, as at block 412. Then run jobs under the new partition as in block 408, and make another check in due course.

On the other hand, if decision block 410 returns a "NO," proceed to decision block 414. In decision block 414, determine if a condition exists wherein the low water mark for large and/or long jobs is exceeded; if such is the case ("YES" branch), then re-partition by increasing the resources devoted to large and/or long jobs and decreasing those devoted to small and/or short jobs, as at block 416. Then run jobs under the new partition as in block 408, and make another check in due course. Otherwise, as per the "NO" branch of block 414, simply continue to run jobs under the old partition as in block 408, and make another check in due course. One significant difference between the first and second exemplary embodiments is that in the second case, the system continues to allocate more resources to small jobs as long as their number is greater than their threshold with no consideration for the large jobs. In the first case, the small jobs get more resources only when the number of large jobs is smaller than their threshold.

Third Non-Limiting Exemplary Embodiment

Figure 5:
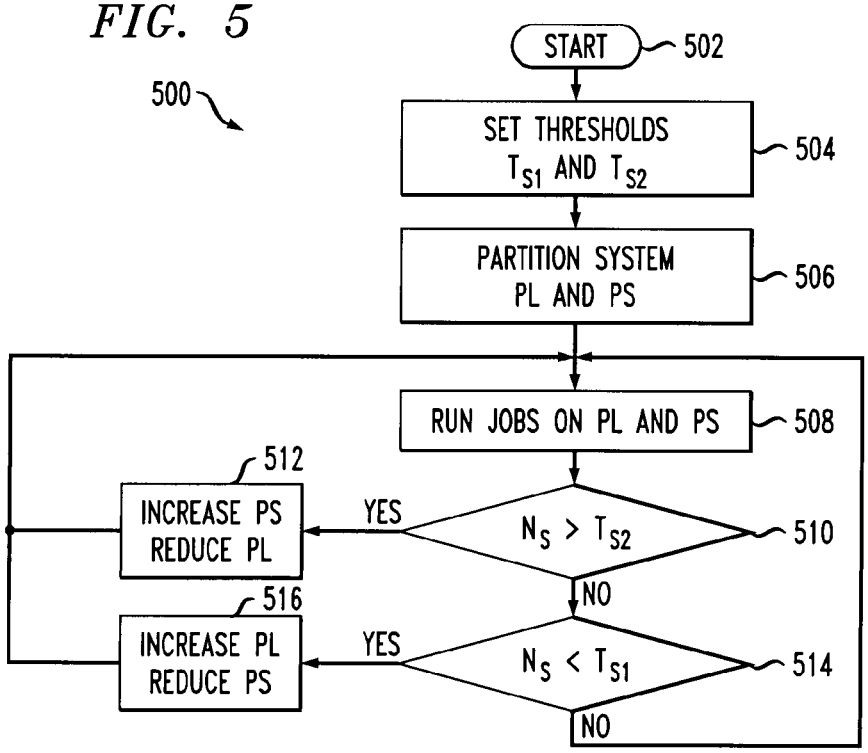
FIG. 5 shows method steps in a third exemplary method for dynamic system scheduling, according to still another aspect of the invention.

With reference now to flow chart 500 of FIG. 5, after beginning in block 502, in block 504, set Ts1 as the low water mark threshold and Ts2 as the high water mark threshold for the number of jobs in the queue of the partition for small and or short jobs. In block 506, partition the system into the partition for the queue assigned for small and/or short running jobs and the partition for the queue assigned for large and/or long running jobs. Partitioning can be carried out as described above (of course, using the criteria as described for this embodiment). In block 508, run various jobs on the partitioned system. Periodically carry out the checks in decision blocks 510 and 514 (the period can be selected as discussed elsewhere herein).

In particular, in decision block 510, determine if a condition exists wherein the number of small and/or short jobs exceeds the high watermark threshold Ts2. This is the case of extreme demand on the queue for small jobs, and the number of small jobs waiting for execution grows very large. If such is the case ("YES" branch), then re-partition by decreasing the resources devoted to large and/or long jobs and increasing those devoted to small and/or short jobs, as at block 512. Then run jobs under the new partition as in block 508, and make another check in due course.

On the other hand, if decision block 510 returns a "NO," proceed to decision block 514. In decision block 514, determine if a condition exists wherein the number of small and/or short jobs fell below the low watermark threshold Ts1. This indicates the case when there are not many jobs demanding the resources from the queue for small jobs, and resources can be reallocated to the queue for large jobs. If this is the case ("YES" branch), then re-partition by increasing the resources devoted to large and/or long jobs and decreasing those devoted to small and/or short jobs, as at block 516. Then run jobs under the new partition as in block 508, and make another check in due course. Otherwise, as per the "NO" branch of block 514, simply continue to run jobs under the old partition as in block 508, and make another check in due course.

This embodiment differs from the previous two. Comparing to the first embodiment, it considers only demand for the small queue, and not demand for the large queue. Comparing to the second embodiment, it enables fine-tuning of resources: it gives away resources if the number of jobs in a queue is small, and requests additional resources if the number of jobs is too large. Similarly, another embodiment analogous to FIG. 5 but considering only resources in the queue with large jobs (as opposed to small and/or short jobs as in FIG. 5) is also possible.

The third non-limiting exemplary embodiment advantageously reduces or eliminates unnecessary re-partitioning; i.e., the number of jobs in the short/small partition must be "really big" before reducing PL. Again, as noted, an analogous case is possible with multi-thresholds for $T_L$ instead.

Operation Modes and Job Classification

Figure 7:
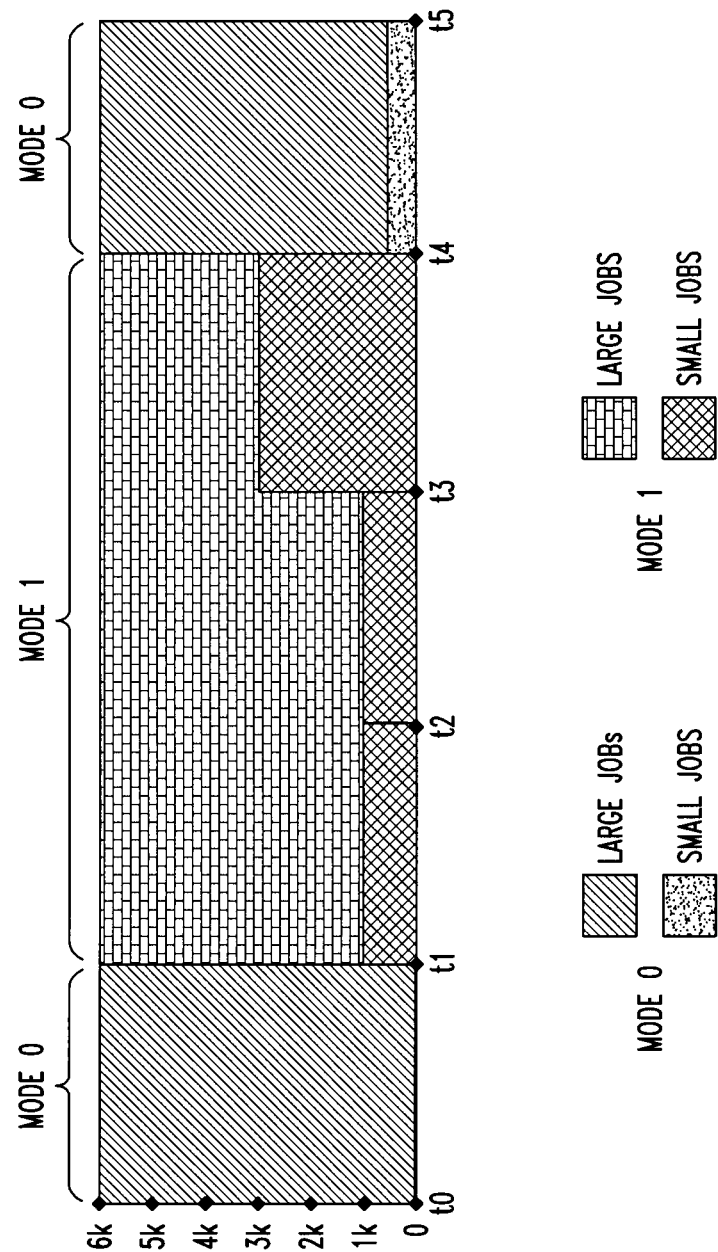
FIG. 7 shows exemplary resource usage modes.

Reference should now be had to FIG. 7, which defines operation modes and job classification. Non-limiting examples of modes include a low interactive activity mode, high batch job mode; a high interactive activity mode; and/or a maintenance mode. Defined operation modes can be two or more. Non-limiting examples of job classifications can be based on: the submitted job sizes, in terms of execution time and resources required; and/or user activity (i.e., interactive or batch jobs). FIG. 7 shows job classifications of small or large. A system can operate in different modes at different periods of time (e.g., $t_0, t_1, t_2 \ldots$). The limiting number of executing jobs in each class are designated by the vertical axis (e.g. 0, 1 k, 2 k, . . . ). One example illustrated in FIG. 7 is the desirable number of large jobs is 6000 (6 k) for Model 0, which is the mode of operation for the time period between $t_0$ and $t_1$.

Non-limiting examples of "small" and "short" jobs include debugging, interactive programs, development, testing, and the like. As used herein, "short" means relatively short execution times; and "small" means that relatively few resources; e.g., relatively few nodes, are required. Non-limiting examples of "long" and "large" jobs may refer to production runs, batch jobs, month-end reports, and the like. As used herein, "long" means relatively long execution times such as multiple minutes, hours, or even days; and "large" means that relatively many resources; e.g., relatively many nodes, are required.

In some instances, two job queues are used. In other embodiments, more than two queues can be used.

With continued reference to FIG. 7, at point $t_1$, based on historical resource usage, assign resources according to the second mode of operation, namely, Mode 1. Operation in mode 1 continues until point $t_4$. At point $t_4$, based on the historical usage of the resources, again assign resources in accordance to the first mode of operation, namely, Mode 0 (for example, to a high-interactive, low batch mode). Within a mode, reassign resources dynamically when needed (typically, this is carried out when the number of jobs in a queue is greater than the high-water mark threshold, i.e., N>T). Note that at $t_3$, Ns>Ts; accordingly, reassign resources to the small queue while operating within Mode 1.

Descriptions of Additional Flow Charts

Figure 8:
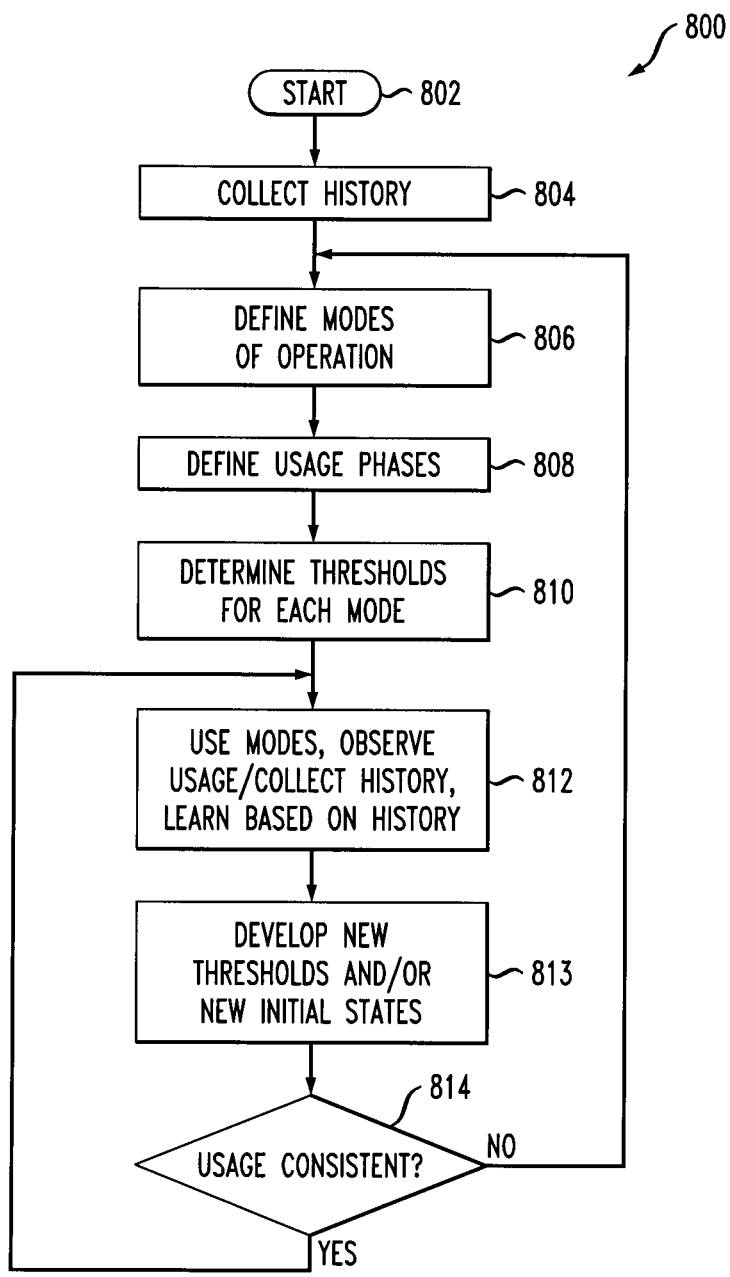
FIGS. 8 and 9 show flow charts of exemplary method steps, according to one or more aspects of the invention.

Reference should now be had to flow chart 800 of FIG. 8, which begins in step 802. One or more embodiments of the invention employ the history of jobs for predictive scheduling. For example, as in step 804, collect knowledge of usage of the system, including periods with high and low interactive usage. It may also be desirable to collect knowledge of applications, including those repeatedly submitted, bearing in mind that to avoid premature termination, the user-specified maximum run time is often much longer than really necessary for the application to run. Since provisioning required resources is time-consuming, accurate prediction is helpful.

In at least some cases, as in step 806, define multiple modes of operation based on the history of system usage from step 804. Determine two or more modes of operation.

As in step 808, define usage phases, e.g., determine historic times in a time unit such as a day, week, or month where each of the system usage modes is most common; and/or identify time periods where activity typically changes; for example, workdays, nights, and weekends. The usage phase is a period of time in which system utilization and application information are collected for characterization of usage for an operation mode.

In step 810, determine thresholds for each mode; for example, a high water mark threshold (the number close to the limiting number of jobs), as discussed below. In step 812, operate the system based on the modes defined in step 806, and observe what happens (in essence, continuing to collect history); learn based on the history. In 813, determine new thresholds and/or new initial states (partitions) for each mode, based on step 812. In decision block 814, determine whether the system usage is consistent with the characterization of the operation mode; if so, as per the "YES" branch, continue with step 812. If the system usage is not consistent, as per the "NO" branch, go back to step 806 and re-define the modes of operation, taking into account the inconsistency observed during step 812.

It will thus be appreciated that the definition of the modes in essence predicts, based on historical data, how resources should be partitioned at a particular time, based on historical data.

Figure 9:
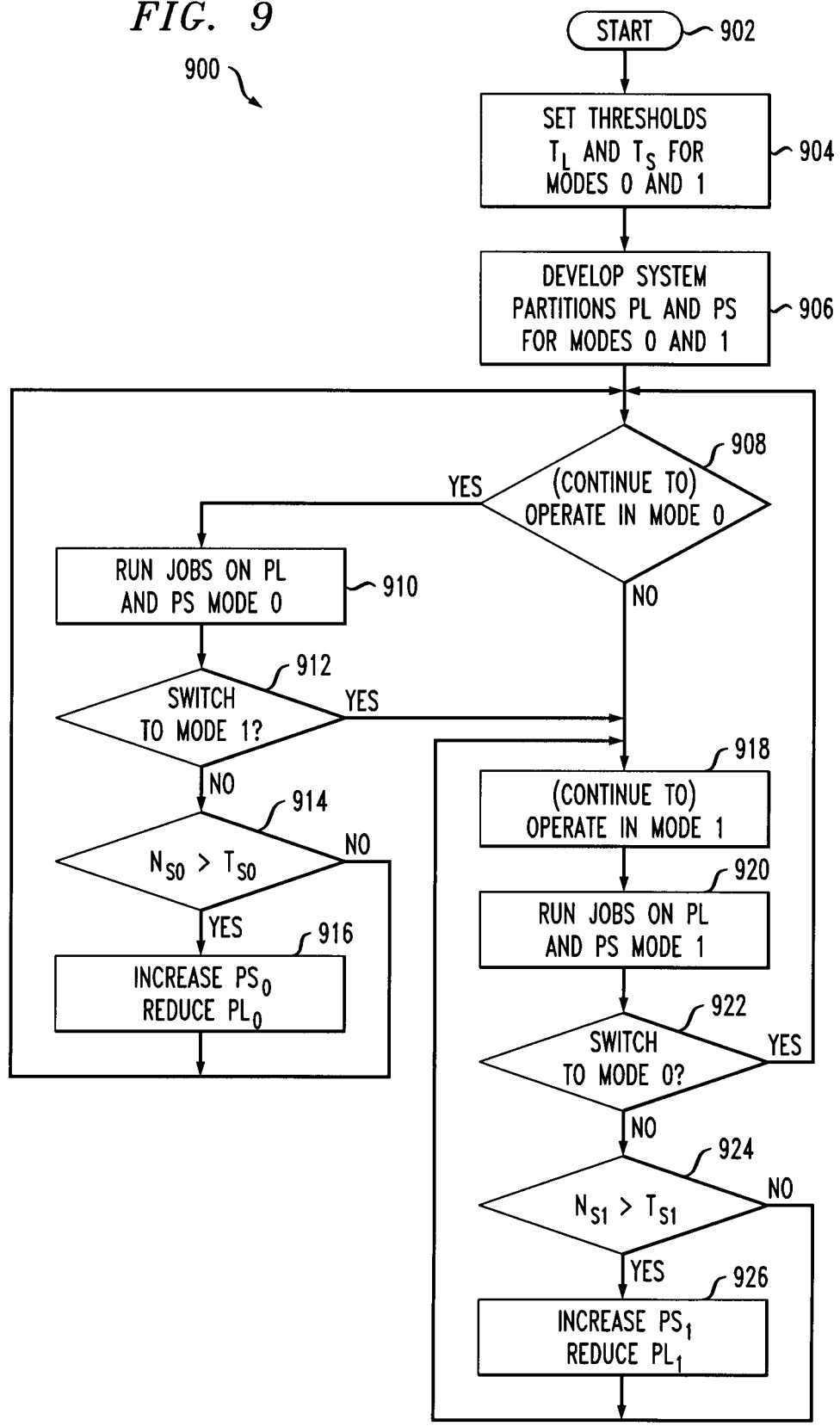

Reference should now be had to flow chart 900 of FIG. 9, which begins in step 902. In step 904, optionally set the thresholds $T_L$ and $T_S$ for each of the modes zero and one; for example, the above-mentioned high water mark threshold(s) (subscript "L" signifying long and/or large and subscript "S" signifying short and/or small). To increase job throughput, one or more embodiments make use of multiple job queues. In at least some cases, provide two queues; for example, a queue for small, short, and/or interactive jobs ($T_S$ is associated with this), and another queue for large, long, and/or batch jobs ($T_L$ is associated with this). Furthermore, as in step 906, specify a resource allocation (partition) for each queue for each mode; e.g., partitions $P_L$ and $P_S$ for each of the modes zero and one.

As used herein and discussed above, "small" and "large" refer to the amount of system resources and "short" and "long" refer to the time these resources are needed by a job. The criteria for the classifications of small, large, short and long vary from system to system and are usually set by experienced system administrators to reflect the requirements and characteristics of their own workloads on their system. "Interactive" and "batch" are used in their ordinary sense as will be familiar to the skilled artisan.

One or more embodiments make use of mode switching. At appropriate time intervals, change the modes. Reassign the resource allocation based on the mode of operation selected. Each partition has assigned a high water mark threshold for the number of jobs in the associated queue. If the number of jobs in one queue is above the high-water mark threshold, repartition the system, and free the resources from the underutilized partition.

Thus, with continued reference to FIG. 9, after the initial setting of thresholds for job queues and partition specification, in block 908, determine whether the system should initially be operated in mode zero (step 908 is depicted as a rectangle to save drawing space but could be depicted as a decision block). If so, continue with step 910, and run jobs in accordance with mode zero, with the resource partitions $P_L$ and $P_S$ for the mode zero. If not, as per the "NO" branch, proceed to block 918, and the system will initially be operated in mode one. Then, continue with step 920, and run jobs in accordance with mode zero.

As noted, if block 408 yields a "YES," proceed to block 410 and run the system in mode zero. During operation under such conditions, as per block 912, periodically determine if it is time to switch to mode one. If so, proceed to block 918. Optionally, "fine tune" while running in mode zero—for example, determine in block 914 whether the number of jobs in the queue for small, short, and/or interactive jobs in mode zero ($N_{S0}$) is greater than the corresponding high water mark threshold ($T_{S0}$). If so, as per the "YES" branch, proceed to block 916 and increase the resources devoted to the partition for small, short, and/or interactive jobs in mode zero ($PS_0$), while reducing the resources devoted to the partition for large, long, and/or batch jobs in mode zero ($PL_0$). Then proceed back to step 908. On the other hand, if block 914 returns a "NO," proceed directly back to step 908.

It should be noted that the "fine tuning" aspect 914, 916, 924, 926 is optional. Where "fine tuning" is employed, any suitable technique can be used (including, for example, any of the techniques in FIGS. 3-5 above). Step 904 shows setting two thresholds for each mode, but if only one is to be used then only one need be specified (and if none are to be used none need be specified).

To determine if it is time to switch modes, in steps 912 and 922, a variety of techniques can be employed. In one or more embodiments, consider any one, some or all of time of day, day of week, month of year, whether it is a holiday, and so on, together with the historical observations described with respect to FIG. 8. In some instances, a maintenance mode may be entered at a predetermined time, during a holiday, or so on; in some cases, partitioning may be eliminated for a maintenance mode.

If blocks 908 yields a "NO" or block 912 yields a "YES," proceed to blocks 918, 920 and run the system in mode one, with the partitions $P_L$ and $P_S$ for the mode one. During operation under such conditions, as per block 922, periodically determine if it is time to switch to mode zero. If so, proceed to block 908. Optionally, "fine tune" while running in mode one—for example, determine as per block 924 whether the number of jobs in the queue for small, short, and/or interactive jobs in mode one ($N_{S1}$) is greater than the corresponding high water mark threshold ($T_{S1}$). If so, as per the "YES" branch, proceed to block 926 and increase the resources devoted to the partition for small, short, and/or interactive jobs in mode one ($PS_1$), while reducing the resources devoted to the partition for large, long, and/or batch jobs in mode one ($PL_1$). Then proceed back to step 918. On the other hand, if block 924 returns a "NO," proceed directly back to step 918.

A number of variations are possible; for example, more than two modes of operation (such as a maintenance mode in addition to low interactive and high interactive). Furthermore, various time intervals can be used for re-scheduling within a mode; for example, job termination, checkpoints, regular time intervals, and so on.

Recapitulation

Given the discussion thus far, it will be appreciated that, in general terms, an exemplary method, according to an aspect of the invention, includes the step 306, 406, 506 of partitioning resources of a partitionable computer system into a first partition for first jobs (small and/or short running) and a second partition for second jobs (large and/or long running). As noted above, "small" and "large" refer to the amount of system resources and "short" and "long" refer to the time these resources are needed by a job. More than two queues can be used in some instances. An additional step 308, 408, 508 includes running the computer system as partitioned in the partitioning step. Furthermore, an additional step (e.g., 310, 314; 410, 414; 510, 514) includes periodically re-evaluating the partitioning against at least one threshold for at least one of the partitions. A further step (e.g., 312, 316; 412, 416; 512, 516) includes, if the periodic re-evaluation suggests that one of the first and second partitions is underutilized, dynamically re-partitioning the resources of the partitionable computer system to reassign at least some of the resources of the partitionable computer system from the underutilized one of the first and second partitions to another one of the first and second partitions. The number of resources to be moved can be determined as described above.

As used herein, including the claims, "underutilized" is a relative term—it simply means that system throughput will benefit from taking resources from the underutilized partition and assigning them to the other partition—it does not necessarily imply that the resources in the underutilized partition are not being intensively used.

Note that in some embodiments, the above-mentioned partitionable computer system is a multi-processor system as shown in FIG. 1. Furthermore, in one or more embodiments, the two partitions are different groups of processing nodes (or other computing elements) 102, 104, and so on. A piece of software may be used to list the number or processing nodes in each group. When re-partitioning using such software, some number of processing nodes are removed from one of the groups and transferred to the other group. This can be carried out, for example, by changing the connectivity of the processing nodes that are to be re-assigned—say, from Group 1 to Group 2 (preferably without any physical change of location). The piece of software that lists the number or processing nodes in each group and re-assigns the processing elements can reside anywhere; for example, on any one or more of the processors 122, 124; in an external control unit 199 which re-configures the network switch 138; partly on a control unit 199 and partly on one or more of the processing nodes, and so on. In some instances, the functionality may be incorporated into distributed system management software. In some instances, a piece of software on each of the nodes 102, 104, and so on, is configured to associate that node with a particular Group.

In at least some instances, in the partitioning step, the first partition is associated with a first queue comprising the first jobs and the second partition is associated with a second queue comprising the second jobs. In one or more embodiments, the re-evaluating step comprises comparing at the number of first jobs and/or the number of second jobs against the at least one threshold; by way of example, a low water mark threshold for the number of jobs in the particular queue.

In at least some instances, the at least one threshold comprises a first threshold, and the re-evaluating step comprises comparing the number of first jobs against the first threshold (a low water mark threshold for the first queue) and comparing the number of second jobs against a second threshold (a low water mark threshold for the second queue).

With particular reference to FIG. 3, in some cases, the at least one threshold comprises a first threshold, and the re-evaluating step comprises carrying out steps 310 and 314. In particular, if the number of first jobs is greater than the first threshold (low water mark threshold for the first queue); i.e., $N_S > T_S$; and the number of second jobs is less than a second threshold (low water mark threshold for the second queue); i.e., $N_L < T_L$; then, in the dynamic re-partitioning, the underutilized one of the first and second partitions comprises the second partition (block 312). If these conditions are not satisfied, determine if the number of first jobs is less than the first threshold; i.e., $N_S < T_S$; and the number of second jobs is greater than the second threshold; i.e., $N_L > T_L$; if so, then, in the dynamic re-partitioning, the underutilized one of the first and second partitions comprises the first partition (block 316). Otherwise, refrain from dynamic re-partitioning at the current time, as per the "NO" branch of block 314.

With particular reference to FIG. 4, in some cases, the at least one threshold comprises a first threshold, and the re-evaluating step comprises carrying out steps 410 and 414. In particular, if the number of first jobs is greater than the first threshold (low water mark threshold for the first queue); i.e., $N_S > T_S$; then, in the dynamic re-partitioning, the underutilized one of the first and second partitions comprises the second partition (block 412). If this condition is not satisfied, determine if the number of second jobs is greater than the second threshold; i.e., $N_L > T_L$; then, in the dynamic re-partitioning, the underutilized one of the first and second partitions comprises the first partition (block 416). Otherwise, refrain from dynamic re-partitioning at the current time, as per the "NO" branch of block 414.

With particular reference to FIG. 5, in some cases, the at least one threshold comprises a first threshold; and the re-evaluating step comprises carrying out steps 510 and 514. In particular, if the number of first jobs is greater than a second threshold (the second threshold comprising a high water mark threshold for the first queue), i.e., $N_S > T_{S2}$, then, in the dynamic re-partitioning, the underutilized one of the first and second partitions comprises the second partition (block 512). If this condition is not satisfied, determine if the number of the first jobs is less than the first threshold (the first threshold comprising a low water mark threshold for the first queue), i.e., $N_S < T_{S1}$, then, in the dynamic re-partitioning, the underutilized one of the first and second partitions comprises the first partition (block 516). Otherwise, refraining from dynamic re-partitioning at the current time, as per the "NO" branch of block 514.

In a converse case to FIG. 5, the at least one threshold comprises a first threshold; and the re-evaluating step comprises carrying out steps analogous to steps 510 and 514. In particular, if the number of the second jobs is greater than a second threshold (the second threshold comprising a high water mark threshold for the second queue), i.e., $N_L > T_{L2}$, then, in the dynamic re-partitioning, the underutilized one of the first and second partitions comprises the first partition (analogous to block 512). If this condition is not satisfied, determine if the number of the second jobs is less than the first threshold (the first threshold comprising a low water mark threshold for the second queue), i.e., then, in the dynamic re-partitioning, the underutilized one of the first and second partitions comprises the second partition (analogous to block 516). Otherwise, refraining from dynamic re-partitioning at the current time (analogous to "NO" branch of block 514).

The periodic re-evaluation step can be carried out based upon a number of criteria, as discussed above.

It will be appreciated that in some instances, resources are switched between two or more partitions based on measurements at a particular time (for example, using thresholds). In other instances, resources are switched between two or more partitions at a higher level, with a larger time granularity, based on predictive changes from historical observations. Purely by way of example and not limitation, it might have been observed that during normal work hours, there are many interactive jobs; while after normal work hours, there are many batch jobs. In such a case, around the time when most interactive users are predicted to go home, a change may be mode from a mode that favors interaction to a mode that favors batch, based on the historical observations. In still other instances, both techniques can be used; i.e., the high level mode changes based on historical observation as well as "fine tuning" within the modes based on the measurements at a particular time, using thresholds or the like.

Furthermore, in the broadest case, when switch back to mode zero after having switched to mode one from mode zero, the partitioning that is selected after switching back to mode zero may or may not be the default or baseline partitioning for mode zero or the same partitioning that the system was in when it last was running in mode zero. Furthermore, the baseline partitioning for the modes can be static or can updated; for example, based on an ongoing learning process. The same is true when switching back to mode one after having switched to mode zero from mode one (and analogously if more than two modes are employed).

Given the discussion thus far, it will be appreciated that, in general terms, an exemplary method, according to an aspect of the invention, includes the optional step 904 of setting at least one first mode threshold for a first mode of operation of a partitionable computer system and at least one second mode threshold for a second mode of operation of the partitionable computer system. A further step 906 includes partitioning resources of the partitionable computer system into at least first and second partitions, in accordance with one of the modes.

There may be several differences between different modes. The thresholds (where used) may be different. Furthermore, each mode may have a default or initial partition specification, which indicates how to partition the resources when first entering such mode.

The first and second modes of operation can be defined in accordance with historical observations of the partitionable computer system, as described with respect to FIG. 8.

In one or more embodiments, the partitioning takes place as follows. For a first mode, define a first mode first partition for first mode first jobs (small, short running, and/or interactive jobs) and also define a first mode second partition for first mode second jobs (large, long running, and/or batch jobs). Similarly, for a second mode, define a second mode first partition for second mode first jobs (small, short running, and/or interactive) and also define a second mode second partition for second mode second jobs (large, long running, and/or batch).

A further step 910 or 920, as the case may be, includes running the computer system, in one of the first and second modes (hereinafter, the initially selected mode—selected, for example, in accordance with blocks 908 and 918), partitioned, in accordance with the partitioning step, for the initially selected mode. A still further optional step 914, 922 includes periodically re-evaluating the partitioning. If running in the first mode, re-evaluate against the at least one first mode threshold for at least one of the first mode first partition and the first mode second partition. If running in the second mode, re-evaluate against the at least one second mode threshold for at least one of the second mode first partition and the second mode second partition.

As indicated in blocks 916 and 926, if the periodic re-evaluation suggests that one of the partitions for the initially selected mode is underutilized, dynamically re-partition the resources of the partitionable computer system to reassign at least some of the resources of the partitionable computer system from the underutilized one of the first and second partitions for the initially selected mode to the other partition for the initially selected mode.

When reassigning resources between the two partitions, a number of compute and interconnects resources are moved from one partition to the other partition. The exact size of the resources moved from one partition to the other can be either predetermined, or it can be programmable. In addition, the size of resources assigned from the queue A to the queue B does not have to be the same as when assigning resources from the queue B to the queue A. The selection of the size of resources to be moved from one partition to the other can be performed in any appropriate way, and different embodiments may use different techniques.

Note that in some embodiments, the above-mentioned partitionable computer system is a multi-processor system as shown in FIG. 1. Furthermore, in one or more embodiments, the two partitions are different groups of processing nodes (or other computing elements) 102, 104, and so on. A piece of software may be used to list the number or processing nodes in each group. When re-partitioning using such software, some number of processing nodes are removed from one of the groups and transferred to the other group. This can be carried out, for example, by changing the connectivity of the processing nodes that are to be re-assigned—say, from Group 1 to Group 2 (preferably without any physical change of location). The piece of software that lists the number or processing nodes in each group and re-assigns the processing elements can reside anywhere; for example, on any one or more of the processors 122, 124; in an external control unit 199 which re-configures the network switch 138; partly on a control unit 199 and partly on one or more of the processing nodes, and so on. In some instances, the functionality may be incorporated into distributed system management software. In some instances, a piece of software on each of the nodes 102, 104, and so on, is configured to associate that node with a particular Group.

A still further step 912, 922 includes periodically determining whether the computer system should be switched from the initially selected mode to the other mode. This periodic determination can be carried out based on predictions in accordance with the historical observations, as discussed with respect to FIG. 8.

In at least some cases, responsive to the periodic determination being affirmative (i.e., "YES" branch from block 912 or 922), as per steps 908, 910 or 918, 920 as the case may be, run the computer system in the other mode (i.e., not the initially selected mode), partitioned in accordance with the other mode.

As discussed elsewhere, the partitions are typically associated with corresponding queues including corresponding jobs. For example, in step 906, for the first mode, the first mode first partition is associated with a first mode first queue including the first mode first jobs, and the first mode second partition is associated with a first mode second queue including the first mode second jobs. Furthermore, for the second mode, the second mode first partition is associated with a second mode first queue including the second mode first jobs, and the second mode second partition is associated with a second mode second queue including the second mode second jobs.

In at least some cases, the re-evaluating step 914, 924 includes comparing the number of jobs in the first partition or the number jobs in the second partition against the at least one first mode threshold or the at least one second mode threshold, depending on what mode the system is running in.

In one or more embodiments, in the comparing as per 914, 924, the at least one first mode threshold (in the example, $T_{S0}$) is a high water mark threshold for the number of jobs in the first partition and/or the number of jobs in the second partition, when running in the first mode, and the at least one second mode threshold (in the example, $T_{S1}$) is a high water mark threshold for the number of jobs in the first partition and/or the number of jobs in the second partition, when running in the second mode.

Once there has been a switch from the initially selected mode to the other mode, in one or more embodiments, the periodic determination 912, 922 continues, as to whether the computer system should be switched from the other mode back to the initially selected mode. If the answer is affirmative, as per the "YES" branch of block 912 or 922 respectively, again run the computer system, in the initially selected mode, partitioned, in accordance with the partitioning step, for the initially selected mode. Recall the comments above on re-setting the partitioning when switching back and forth between modes.

As noted, the periodic re-evaluation step 914, 924 can be carried out, for example, upon job termination, upon reaching a job checkpoint, and/or upon passage of a predetermined time interval.

One or more embodiments also include a step of developing the appropriate modes, partitions, and thresholds based on historical data, as in FIG. 8.

As noted, in some embodiments, there can be more than two modes (for example, a third mode which could be, for example, a maintenance mode). Thus, step 904 could include setting thresholds for more than two modes, and step 906 could include partitioning for more than two modes. Thus, step 906, in some cases, could further include partitioning the resources of the partitionable computer system into a third mode first partition for third mode first jobs (small, short running, and/or interactive) and a third mode second partition for third mode second jobs (large, long running, and/or batch). In some instances, the third mode may be a maintenance mode, and in some instances, the system is not partitioned in the maintenance mode. An analogous periodic determining step (analogous to 912, 922) could include periodically determining whether the computer system should be switched to the third mode. Responsive to an affirmative, the computer system could be run in the third mode (in a step analogous to steps 910, 920), partitioned, in accordance with the third mode partitioning step (or optionally not partitioned in some cases, such as some types of maintenance modes). While running in the third mode, in a manner analogous to steps 914, 924, optionally periodically re-evaluate the third mode partitioning against at least one third mode threshold for the third mode first partition and/or the third mode second partition. In a manner analogous to steps 916, 926, if the third mode periodic re-evaluation suggests that one of the first and second partitions for the third mode is underutilized, dynamically re-partitioning the resources of the partitionable computer system to reassign at least some of the resources of the partitionable computer system from the underutilized one of the first and second partitions for the third mode to the other one of the first and second partitions for the third mode. Of course, the third or other modes could also be an option in the determination as to what mode to run in, with an analogous decision block to 908, 918.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
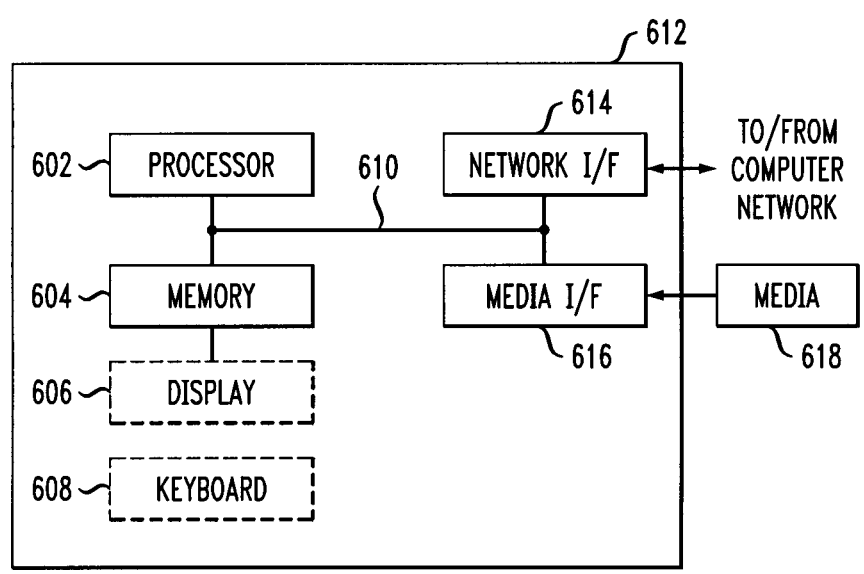
FIG. 6 depicts a computer system that may be useful in implementing one or more aspects and/or elements of the invention.

One or more embodiments can make use of software running on a general purpose computer or workstation. With reference to FIGS. 1 and 6, such an implementation might employ, for example, a processor 122, 124, 602, a memory 118, 120, 604, and an input/output interface formed, for example, by a display 606 and a keyboard 608 (input/output functionality could of course also be provided in the system of FIG. 1). The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 122, 124, 602, memory 118, 120, 604, and input/output interface such as display 606 and keyboard 608 can be interconnected, for example, via bus 610 (or the bus elements discussed with respect to FIG. 1) as part of a data processing unit 100, 612. Suitable interconnections, for example via bus 610, can also be provided to a network interface 106, 614, such as a network card, which can be provided to interface with a computer network, and to a media interface 616, such as a diskette or CD-ROM drive, which can be provided to interface with media 618 (such functionality could of course also be provided in the system of FIG. 1).

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 122, 124, 602 coupled directly or indirectly to memory elements 118, 120, 604 through a system bus 610 (or the bus elements discussed with respect to FIG. 1). The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 106, 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

For the avoidance of doubt, one or more embodiments of the invention are directed to dynamic system scheduling wherein a computer system is partitionable (for example, has parallel-distributed processing capability); FIG. 6 is included for completeness and to illustrate exemplary input/output and media interface functionality.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a partition tracking module (which maintains the list or resources in each partition) and a re-partition calculating module (which performs the calculations to determine when and/or by how much to re-partition). A third "mode-switching" module could be provided in addition to or in lieu of the re-partition calculating module to determine when to switch modes. A fourth "learning" module could be provided to determine what partitioning to use when switching between modes; for example, using previous behavior as described with respect to FIG. 8. The method steps can then be carried out using the distinct software modules and/or sub-modules of the system, as described above, executing on one or more hardware processors 122, 124, 602. Further, a computer program product can include a computer-readable storage medium with code adapted to be implemented to carry out one or more method steps described herein, including the provision of the system with the distinct software modules.

It will also be appreciated that re-partitioning transforms the partitionable computer system different state or thing by re-assigning resources (by way of example and not limitations, re-assigning hardware associated with the nodes 102, 104)

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like.

Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method comprising:
partitioning resources of a partitionable computer system into:
a first partition for first jobs, said first jobs being at least one of small and short running; and
a second partition for second jobs, said second jobs being at least one of large and long running;
running said computer system as partitioned in said partitioning step;
periodically re-evaluating said partitioning against at least one threshold for at least one of said partitions; and
if said periodic re-evaluation suggests that one of said first and second partitions is underutilized, dynamically re-partitioning said resources of said partitionable computer system to reassign at least some of said resources of said partitionable computer system from said underutilized one of said first and second partitions to another one of said first and second partitions;
wherein said at least one threshold comprises a first threshold for said first partition and a second threshold for said second partition;
wherein said periodic re-evaluating step comprises comparing a number of said first jobs against said first threshold and comparing a number of said second jobs against said second threshold;
wherein said periodic re-evaluation suggests that a given one of said first partition and said second partition is underutilized if a comparison of said given partition with said at least one threshold suggests underutilization of said given partition while a comparison of the other one of said first partition and said second partition with said at least one threshold does not suggest underutilization of said other partition;
wherein, in said partitioning step, said first partition is associated with a first queue comprising said first jobs and said second partition is associated with a second queue comprising said second jobs; and wherein said first threshold comprises a low water mark threshold for said first queue and said second threshold comprises a low water mark threshold for said second queue.

2. The method of claim 1, wherein said periodic re-evaluation step is carried out upon job termination.

3. The method of claim 1, wherein said periodic re-evaluation step is carried out upon reaching a job checkpoint.

4. The method of claim 1, wherein said periodic re-evaluation step is carried out upon passage of a predetermined time interval.

5. The method of claim 1, wherein said periodic re-evaluation step is carried out upon request by at least one currently running application.

6. The method of claim 1, wherein said periodic re-evaluation step is carried out upon triggering by a workflow manager.

7. The method of claim 1, wherein said periodic re-evaluation step is carried out upon program phase change.

8. The method of claim 1, further comprising providing a system, wherein said system comprises distinct software modules, each of said distinct software modules being embodied on a computer-readable storage medium, and wherein said distinct software modules comprise a partition tracking module and a re-partition calculating module; wherein:

said partitioning step is carried out by said partition tracking module executing on at least one hardware processor; and said periodic re-evaluating step is carried out by said re-partition calculating module executing on said at least one hardware processor.

9. A method comprising:

partitioning resources of a partitionable computer system into:
  a first partition for first jobs, said first jobs being at least one of small and short running; and
  a second partition for second jobs, said second jobs being at least one of large and long running;

running said computer system as partitioned in said partitioning step;

periodically re-evaluating said partitioning against at least one threshold for at least one of said partitions; and if said periodic re-evaluation suggests that one of said first and second partitions is underutilized, dynamically re-partitioning said resources of said partitionable computer system to reassign at least some of said resources of said partitionable computer system from said underutilized one of said first and second partitions to another one of said first and second partitions;

wherein, in said partitioning step, said first partition is associated with a first queue comprising said first jobs and said second partition is associated with a second queue comprising said second jobs; and wherein:

said at least one threshold comprises a first threshold; and said re-evaluating step comprises:
  if:
    a number of said first jobs is greater than said first threshold, said first threshold comprising a low water mark threshold for said first queue; and
    a number of said second jobs is less than a second threshold, said second threshold comprising a low water mark threshold for second queue;
  then, in said dynamic re-partitioning, said underutilized one of said first and second partitions comprises said second partition;

otherwise, if:
    said number of said first jobs is less than said first threshold; and
    said number of said second jobs is greater than said second threshold;
  then, in said dynamic re-partitioning, said underutilized one of said first and second partitions comprises said first partition; and otherwise, refraining from said dynamic re-partitioning at a current time.

10. A method comprising:

partitioning resources of a partitionable computer system into:
  a first partition for first jobs, said first jobs being at least one of small and short running; and
  a second partition for second jobs, said second jobs being at least one of large and long running;

running said computer system as partitioned in said partitioning step;

periodically re-evaluating said partitioning against at least one threshold for at least one of said partitions; and if said periodic re-evaluation suggests that one of said first and second partitions is underutilized, dynamically re-partitioning said resources of said partitionable computer system to reassign at least some of said resources of said partitionable computer system from said underutilized one of said first and second partitions to another one of said first and second partitions;

wherein, in said partitioning step, said first partition is associated with a first queue comprising said first jobs and said second partition is associated with a second queue comprising said second jobs; and wherein:

said at least one threshold comprises a first threshold; and said re-evaluating step comprises:
  if a number of said first jobs is greater than said first threshold, said first threshold comprising a low water mark threshold for said first queue, then, in said dynamic re-partitioning, said underutilized one of said first and second partitions comprises said second partition;

otherwise, if said number of said second jobs is greater than a second threshold, then, in said dynamic re-partitioning, said underutilized one of said first and second partitions comprises said first partition; and otherwise, refraining from said dynamic re-partitioning at a current time.

11. A method comprising:

partitioning resources of a partitionable computer system into:
  a first partition for first jobs, said first jobs being at least one of small and short running; and
  a second partition for second jobs, said second jobs being at least one of large and long running;

running said computer system as partitioned in said partitioning step;

periodically re-evaluating said partitioning against at least one threshold for at least one of said partitions; and if said periodic re-evaluation suggests that one of said first and second partitions is underutilized, dynamically re-partitioning said resources of said partitionable computer system to reassign at least some of said resources of said partitionable computer system from said underutilized one of said first and second partitions to another one of said first and second partitions;

wherein, in said partitioning step, said first partition is associated with a first queue comprising said first jobs and said second partition is associated with a second queue comprising said second jobs; and wherein:

said at least one threshold comprises a first threshold; and said re-evaluating step comprises:

if a number of said first jobs is greater than a second threshold, said second threshold comprising a high water mark threshold for said first queue, then, in said dynamic re-partitioning, said underutilized one of said first and second partitions comprises said second partition;

otherwise, if said number of said first jobs is less than said first threshold, said first threshold comprising a low water mark threshold for said first queue, then, in said dynamic re-partitioning, said underutilized one of said first and second partitions comprises said first partition; and otherwise, refraining from said dynamic re-partitioning at a current time.

12. A method comprising:

partitioning resources of a partitionable computer system into:
- a first partition for first jobs, said first jobs being at least one of small and short running; and
- a second partition for second jobs, said second jobs being at least one of large and long running;

running said computer system as partitioned in said partitioning step;

periodically re-evaluating said partitioning against at least one threshold for at least one of said partitions; and if said periodic re-evaluation suggests that one of said first and second partitions is underutilized, dynamically re-partitioning said resources of said partitionable computer system to reassign at least some of said resources of said partitionable computer system from said underutilized one of said first and second partitions to another one of said first and second partitions;

wherein, in said partitioning step, said first partition is associated with a first queue comprising said first jobs and said second partition is associated with a second queue comprising said second jobs; and wherein:

said at least one threshold comprises a first threshold; and said re-evaluating step comprises:

if a number of said second jobs is greater than a second threshold, said second threshold comprising a high water mark threshold for said second queue, then, in said dynamic re-partitioning, said underutilized one of said first and second partitions comprises said first partition;

otherwise, if said number of said second jobs is less than said first threshold, said first threshold comprising a low water mark threshold for said second queue, then, in said dynamic re-partitioning, said underutilized one of said first and second partitions comprises said first partition; and otherwise, refraining from said dynamic re-partitioning at a current time.

13. A computer program product comprising a non-transitory computer readable storage medium having computer readable program code embodied therewith, said computer readable program code comprising:

computer readable program code configured to partition resources of a partitionable computer system into:
- a first partition for first jobs, said first jobs being at least one of small and short running; and
- a second partition for second jobs, said second jobs being at least one of large and long running;

computer readable program code configured to run said computer system as partitioned in said partitioning step;

computer readable program code configured to periodically re-evaluate said partitioning against at least one threshold for at least one of said partitions; and computer readable program code configured to, if said periodic re-evaluation suggests that one of said first and second partitions is underutilized, dynamically re-partition said resources of said partitionable computer system to reassign at least some of said resources of said partitionable computer system from said underutilized one of said first and second partitions to another one of said first and second partitions;

wherein said at least one threshold comprises a first threshold for said first partition and a second threshold for said second partition;

wherein said periodic re-evaluation comprises comparing a number of said first jobs against said first threshold and comparing a number of said second jobs against said second threshold;

wherein said periodic re-evaluation suggests that a given one of said first partition and said second partition is underutilized if a comparison of said given partition with said at least one threshold suggests underutilization of said given partition while a comparison of the other one of said first partition and said second partition with said at least one threshold does not suggest underutilization of said other partition;

wherein, in said computer readable program code configured to partition, said first partition is associated with a first queue comprising said first jobs and said second partition is associated with a second queue comprising said second jobs; and wherein, in said computer readable program code configured to compare, said first threshold comprises a low water mark threshold for said first queue and said second threshold comprises a low water mark threshold for said second queue.

14. An apparatus comprising:

a memory; and at least one processor, coupled to said memory, and operative to:

partition resources of a partitionable computer system into:
- a first partition for first jobs, said first jobs being at least one of small and short running; and
- a second partition for second jobs, said second jobs being at least one of large and long running;

run said computer system as partitioned in said partitioning step;

periodically re-evaluate said partitioning against at least one threshold for at least one of said partitions; and if said periodic re-evaluation suggests that one of said first and second partitions is underutilized, dynamically re-partition said resources of said partitionable computer system to reassign at least some of said resources of said partitionable computer system from said underutilized one of said first and second partitions to another one of said first and second partitions;

wherein said at least one threshold comprises a first threshold for said first partition and a second threshold for said second partition;

wherein said periodic re-evaluation comprises comparing a number of said first jobs against said first threshold and comparing a number of said second jobs against said second threshold;

wherein said periodic re-evaluation suggests that a given one of said first partition and said second partition is underutilized if a comparison of said given partition with said at least one threshold suggests underutilization of said given partition while a comparison of the other one of said first partition and said second partition with said at least one threshold does not suggest underutilization of said other partition;

wherein said first partition is associated with a first queue comprising said first jobs and said second partition is associated with a second queue comprising said second jobs; and wherein said first threshold comprises a low water mark threshold for said first queue and said second threshold comprises a low water mark threshold for said second queue.

15. Said apparatus of claim 14, further comprising a plurality of distinct software modules, each of said distinct software modules being embodied on a computer-readable storage medium, and wherein said distinct software modules comprise partition tracking module and a re-partition calculating module;

wherein:
said at least one processor is operative to partition said resources by executing said partition tracking module; and
said at least one processor is operative to periodic re-evaluate by executing said re-partition calculating module.

16. An apparatus comprising:
means for partitioning resources of a partitionable computer system into:
  a first partition for first jobs, said first jobs being at least one of small and short running; and
  a second partition for second jobs, said second jobs being at least one of large and long running;
means for running said computer system as partitioned in said partitioning step;
means for periodically re-evaluating said partitioning against at least one threshold for at least one of said partitions; and
means for, if said periodic re-evaluation suggests that one of said first and second partitions is underutilized, dynamically re-partitioning said resources of said partitionable computer system to reassign at least some of said resources of said partitionable computer system from said underutilized one of said first and second partitions to another one of said first and second partitions;

wherein said at least one threshold comprises a first threshold for said first partition and a second threshold for said second partition;

wherein said periodic re-evaluation comprises comparing a number of said first jobs against said first threshold and comparing a number of said second jobs against said second threshold;

wherein said periodic re-evaluation suggests that a given one of said first partition and said second partition is underutilized if a comparison of said given partition with said at least one threshold suggests underutilization of said given partition while a comparison of the other one of said first partition and said second partition with said at least one threshold does not suggest underutilization of said other partition;

wherein said first partition is associated with a first queue comprising said first jobs and said second partition is associated with a second queue comprising said second jobs; and wherein said first threshold comprises a low water mark threshold for said first queue and said second threshold comprises a low water mark threshold for said second queue.

* * * * *